Feb. 20, 1940. M. O. TRUDEAU 2,191,262
SIGNAL FOR LIQUID DISPENSING APPARATUS
Filed Feb. 26, 1937 4 Sheets-Sheet 1

Maximillian O. Trudeau INVENTOR.
BY
H. G. Burns ATTORNEY.

Feb. 20, 1940.　　　M. O. TRUDEAU　　　2,191,262
SIGNAL FOR LIQUID DISPENSING APPARATUS
Filed Feb. 26, 1937　　　4 Sheets-Sheet 2
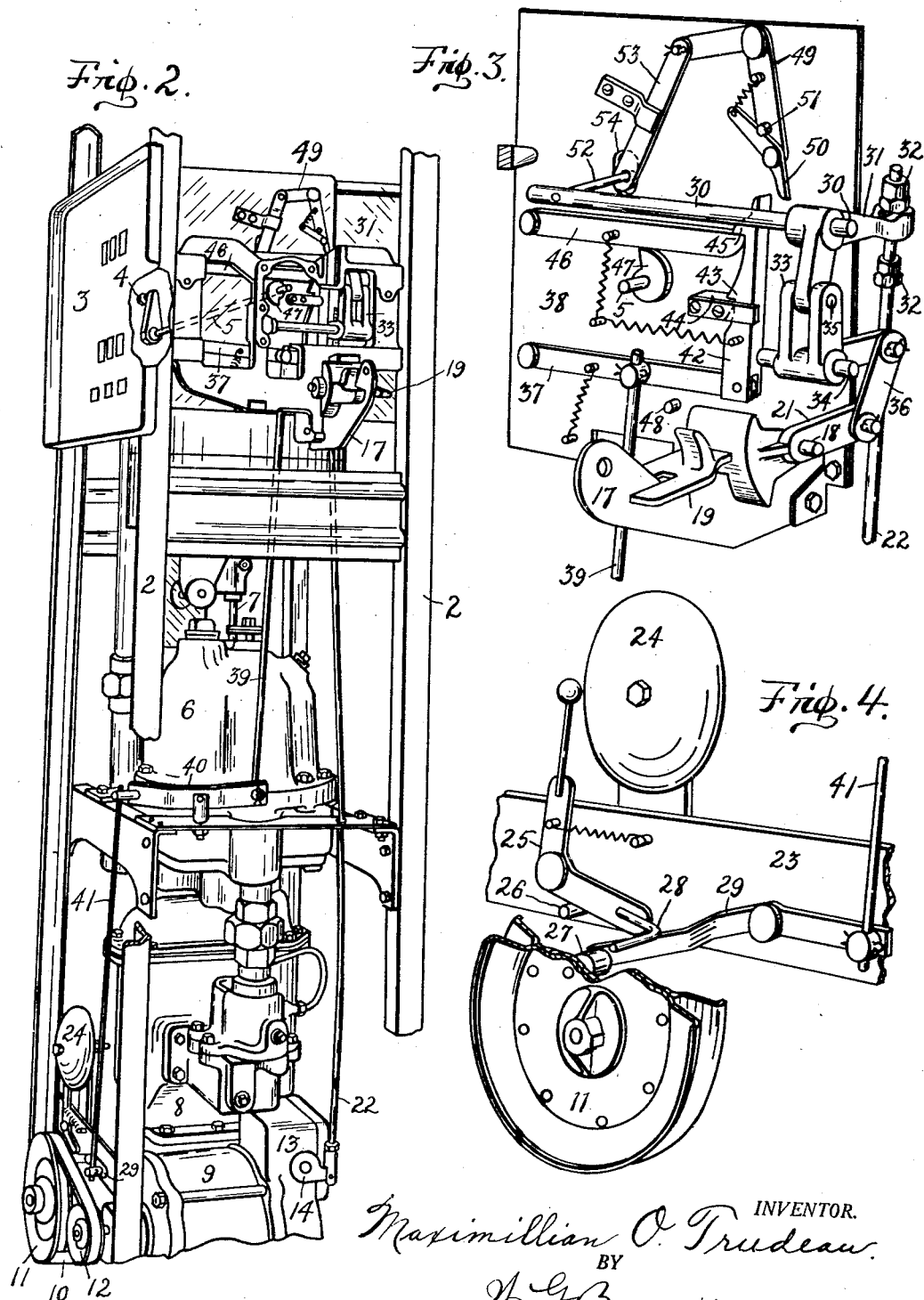
INVENTOR.
Maximillian O. Trudeau
BY
H. G. Burns ATTORNEY.

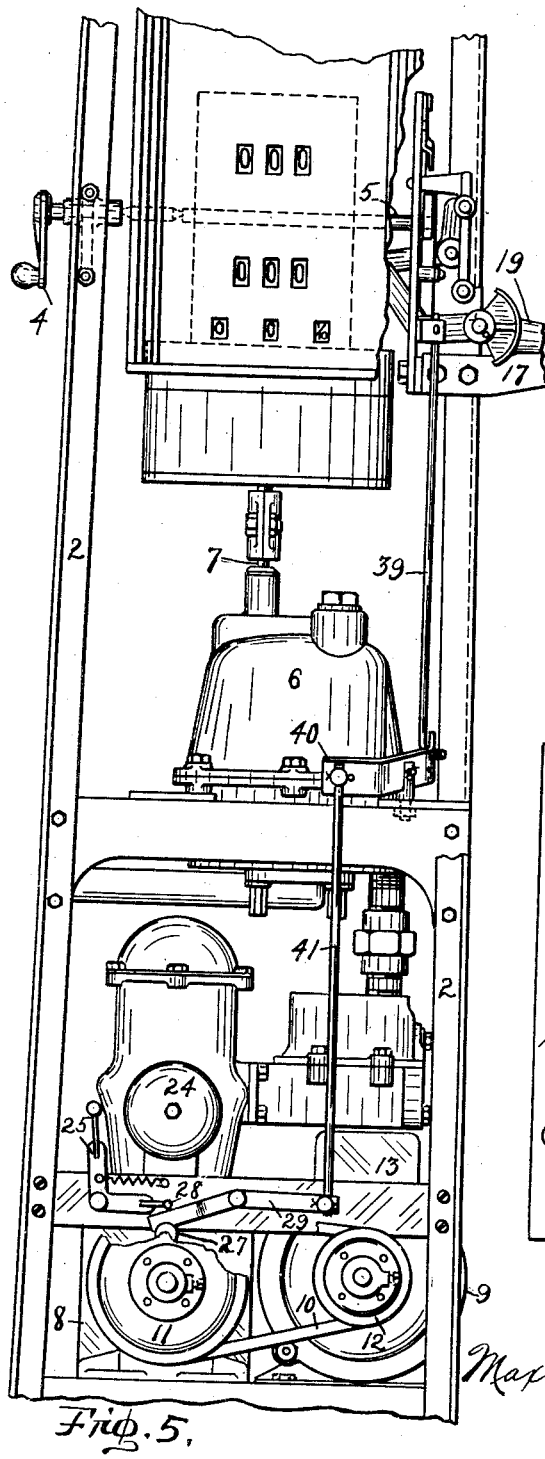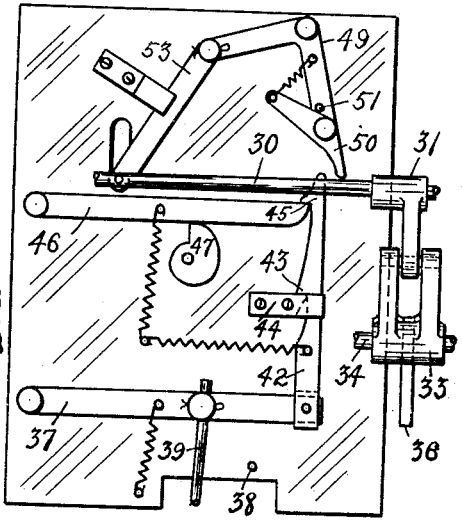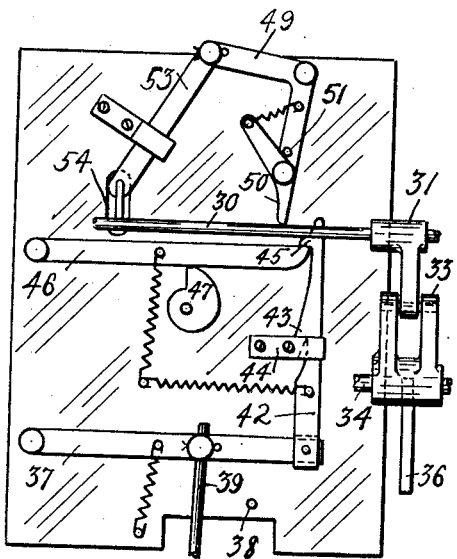

Patented Feb. 20, 1940

2,191,262

UNITED STATES PATENT OFFICE 2,191,262

SIGNAL FOR LIQUID DISPENSING APPARATUS

Maximillian O. Trudeau, Fort Wayne, Ind., assignor to Tokheim Oil Tank and Pump Company, Fort Wayne, Ind., a corporation of Indiana Application February 26, 1937, Serial No. 127,947

7 Claims. (Cl. 221—95)

This invention relates to a liquid dispensing apparatus and is particularly applicable to that more or less general type of dispenser in which there is provided a resettable counter or resettable computer that is operated automatically by a meter whereby liquid being dispensed is measured after being supplied through an electric motor-driven pump and before delivery of the liquid through a hand-operated valve-controlled dispensing nozzle. Ordinarily, counters or computers in that type of apparatus have a crank or handle which upon manual operation thereof causes resetting of the members that indicate the quantity of the liquid that is dispensed, the indicating members, upon completion of the resetting operation, being returned to the starting or zero point. Thus, upon each dispensing operation there is indicated from the zero point at the commencement of the dispensing operation the total amount delivered at the completion of the operation.

An object of the present invention is to apprise patrons and the operator of the dispenser immediately upon commencement of each dispensing operation that the counter or computer had not been properly reset to the zero point, if such be the fact.

Another object of the invention is to afford in conjunction with a liquid dispensing apparatus, provided with a resettable counter or computer, an automatically operated alarm whereby to warn patrons and the operator alike that such counter or computer had not been reset properly, when such is the fact, previous to each dispensing operation.

And a further object is to provide an automatically operated alarm for a liquid dispenser that has an indicating or computing apparatus to show the quantity of liquid dispensed upon each operation thereof, whereby negligence of the operator to reset the indicator or computer before dispensing the liquid therethrough becomes manifest.

Other objects and advantages of the invention will appear in the following description.

The illustrative embodiment of the invention is shown in the accompanying drawings, in which:

Fig. 2 is a fragmentary perspective view of the mechanical structure of a dispenser including the automatically operated alarm mechanism in which the invention is embodied;

Fig. 3 is a fragmentary perspective view showing the support for the dispensing nozzle and trip mechanism for controlling operation of the alarm;

Fig. 4 is a fragmentary perspective view of the alarm mechanism and actuating means therefor;

Fig. 5 is a fragmentary front elevation of a dispenser in which the automatically operated alarm mechanism is embodied; and Figs. 6, 7, 8, 9, 10 and 11 are diagrams showing various positions of the trip mechanism by which the automatically operated alarm is controlled.

The dispenser

Figure 1:
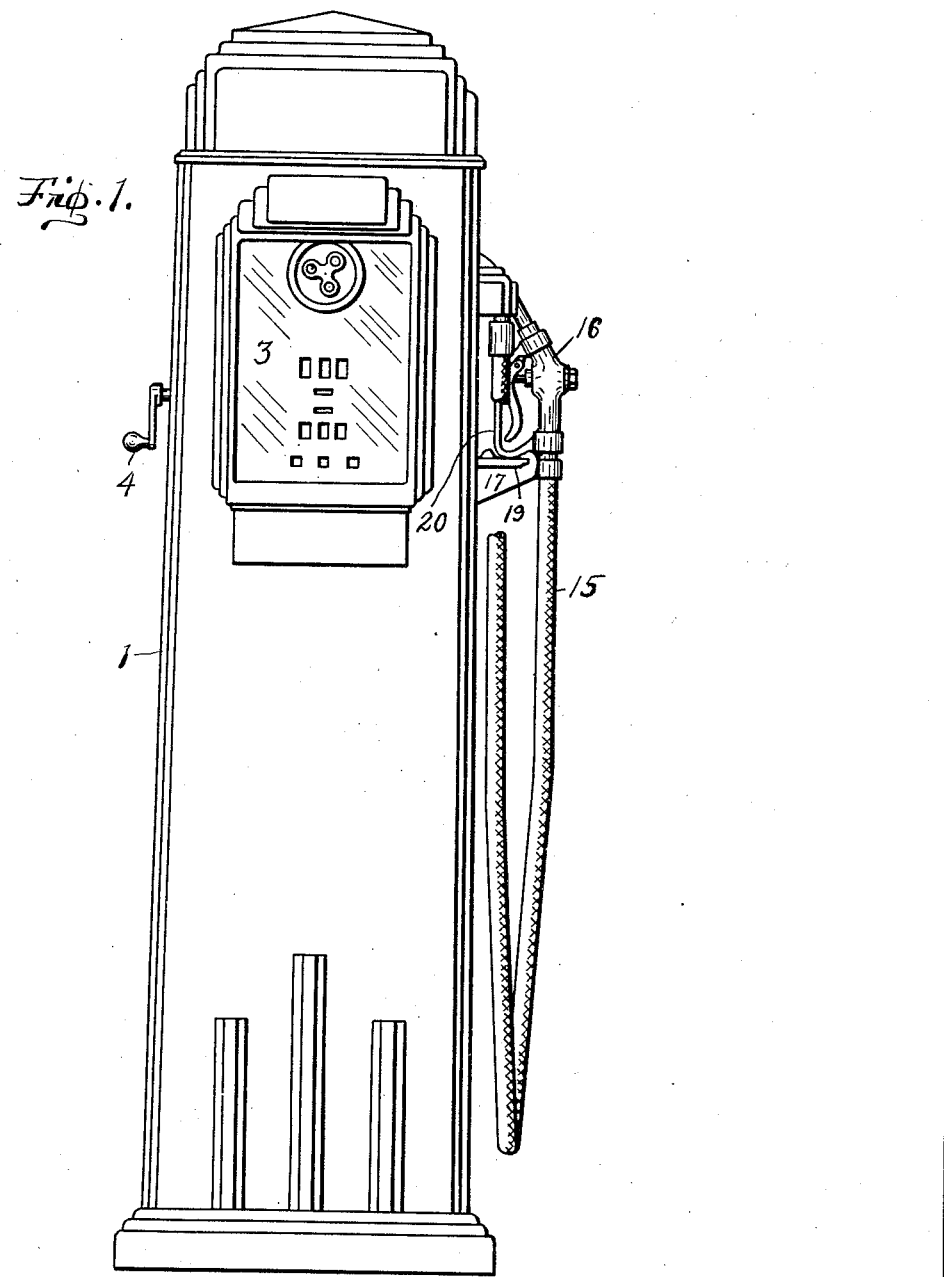
Fig. 1 is a front elevation of a typical gasoline dispenser of a type to which the invention is adaptable, a portion of the dispensing hose being omitted.

For purposes of illustration, in the accompanying drawings there is shown a gasoline dispenser 1 to which the present invention may be applied. Such dispenser has a frame structure 2, in the upper part of which is located a computer 3 provided with a manually operated crank 4 and crank-shaft 5 by which the computer is reset in the usual manner. In the frame 2 is mounted a liquid meter 6 the stem 7 of which is operatively associated with the computer. Also, the dispenser has therein a pump 8 and electric motor 9 for operating the pump through the medium of a belt 10 and pulleys 11 and 12. An electric switch 13 is provided in the frame structure through which current is supplied to the motor from a suitable source of electric energy and conductors (not shown) as in the usual practice. The dispensing apparatus is such that upon closing of the switch, as by turning its operating crank 14 to switch-closing position, the motor is set in motion causing operation of the pump and delivery of liquid to the meter, following which the liquid is dispensed through a flexible hose 15 and manually operated valvular nozzle 16.

In the frame structure 2 is provided a stationary hook 17 for convenient support of the nozzle 16 when not in use. Mounted upon a pivot 18 on the hook is arranged a tilting lever 19, the outer end of which is depressed by the guard 20 of the nozzle when the nozzle is deposited on the hook, and a rearwardly extending arm 21 on said lever is operatively related with the lever 14 of the motor switch by means of a connecting rod 22, the arrangement being such that when the nozzle is disposed upon the hook the lever 19 is tilted causing movement of the switch 13 to its open position. The motor switch preferably is of the common type that inherently, when moved to either its open or closed position, tends to remain in such position. The motor is started by first removing the nozzle from the supporting hook and then manually raising the outer end of the lever 19 thereby causing the motor switch to close. After the dispensing operation, upon replacing the nozzle on the hook, the lever thereby is depressed causing automatic opening of the motor switch and stopping of the motor.

The alarm

At a point in the frame structure 2, preferably located adjacent the pump pulley 11, on a supporting member 23, is arranged a bell 24 and a pivoted spring-restrained bell-clapper 25, there being provided on said member a bumper 26 to limit movement of the bell-clapper. On the pump pulley 11 is provided a lug 27 and on one arm of the clapper is provided a finger 28 the end of which normally, when said arm bears on the bumper, extends into the path of the lug 27 so that as the pulley 11 rotates the clapper is actuated and alarm created by action of the clapper on the bell. Also, on the base member 23 is pivoted an interference lever 29 one end of which extends under the finger 28 on the clapper so that when the lever 29 is tilted to a selected position the clapper is moved out of engageable position thereby circumventing operation of the alarm.

Controlling mechanism

In one application of the invention, it is desirable that the alarm be sounded only in the event the dispensing operation is attempted without first resetting the counter or computer to its zero position, and to accomplish this the controlling mechanism is operatively associated with the counter or computer, and with the switch closing and opening mechanism. Preferably, there is provided a rock-shaft 30 having secured thereon a bell-crank 31, one arm of which has operative connection with the switch operating rod 22, said rod having thereon two pair of jamb-nuts 32 spaced apart to permit sufficient relative play between the rod and the bell-crank to accommodate the rebound of the switch as it is sprung from one extreme position to the other, as when the switch is closed or opened. Another bell-crank 33 is mounted upon a stationary stud 34, one arm of which bell-crank has pivotal connection 35 with the former bell-crank 31, the pivotal connection therebetween having sufficient play to permit the required transmission of movement of one bell-crank to the other to cause proper operation of the connecting rod 22 for the switch. One arm of the bell-crank 33 is operatively connected with the arm 21 on the nozzle-operated lever 19 by means of a connecting bar 36 so that as the lever 19 is raised or lowered, said bell-cranks are actuated and the motor switch accordingly is closed or opened accordingly.

To circumvent operation of the alarm there is provided a spring-restrained lever 37 pivoted on a base-plate 38 on the frame structure conveniently located thereon adjacent the computer 3. Said lever 37 is operatively associated with the interference lever 29 through the medium of a coupling rod 39, pivoted lever 40 and another coupling rod 41. Upon the free end of the lever 37 is pivoted a spring-restrained trigger 42 having on its middle portion a projecting shoulder 43 that has latching engagement with a stationary block 44 on the base-plate 38 so the stroke of said trigger is arrested at an intermediate point. Said trigger has near its upper end a catch 45 that is engageable by a spring-restrained trigger-engaging lever 46 pivoted on the base-plate 38 and which is actuated by a cam 47 that is secured on the computer resetting shaft 5. When the shaft 5 is rotated, as when manually resetting the computer, the lever 46 is raised by the cam into engagement with the catch and the trigger is thereby raised accordingly, whereupon the shoulder 43 is moved into latched engagement with the block 44. Thus the trigger is sustained in elevated position and consequently the interference lever 29 is moved out of action. A stop 48 projects from the base-plate 38 in the path of the lever 37 and limits downward swinging movement thereof at the point for proper engagement of the finger 28 on the clapper with the engaging lug 27 on the pump pulley.

A releasing mechanism is provided for disengaging the trigger 42 from its latched engagement with the stationary block 44 after the counter or computer has been set back to its zero point. This releasing mechanism consists of a bell-crank 49 pivoted on the base-plate 38 which bell-crank has pivoted on one arm thereof a spring-restrained trip lever 50, and is provided also with a stop pin 51 to limit movement of said trip lever in one direction. The other end of the bell-crank 49 has operative relation with the rock-shaft 30 through the medium of an actuating arm 52 that extends angularly from the rock-shaft 30, and a connecting bar 53 through which said arm loosely extends, there being made a slot 54 in the base-plate to afford clearance for the projecting end of the arm.

Operation

In operation, as applied to an audible signal, the apparatus is initially placed with its various parts arranged for commencement of the dispensing operation: First, by resetting the counter or computer to its zero point. In so doing, the trigger is raised into latching engagement and the interference lever is correspondingly turned to and held in inoperative position. The nozzle on the dispensing hose is next removed from its supporting hook; the outer end of the switch control lever 19 is then manually raised, whereupon through the medium of the operatively related bell-cranks 31 and 33 and connecting rod 22, the motor switch is closed and thus the pump is operated. Liquid thereupon flows from the pump through the meter and is dispensed from the nozzle. As the meter operates, the counter or computer is progressed from its zero point in the usual manner. At the completion of the dispensing operation the counter or computer indicates the amount of liquid dispensed, after which the nozzle is returned to its supporting bracket causing the switch lever 19 to automatically move into open position, and also the releasing mechanism likewise is automatically actuated causing disengagement of the trigger and consequent turning of the interference lever out of contact with the bell clapper, so that the alarm automatically is sounded immediately upon starting the pump at the commencement of a subsequent dispensing operation, unless the counter or computer is first reset. In such event, because of the alarm, negligence of the operator in failing to reset the counter or computer before commencing delivery, becomes clearly apparent. The alarm controlling mechanism is automatically reset to inoperative position upon resetting of the counter or computer, and is released for subsequent action automatically when the motor switch is moved to open position.

During the dispensing operation the mechanism for closing and opening the motor switch, the alarm mechanism and its trigger, and the release mechanism for disengaging the trigger are moved into various relative positions sequentially as shown in the accompanying views.

For instance, in Figs. 3 and 6 the parts illustrated are as when the motor switch is open and the trigger is in latched position so that the interference lever 29 (Fig. 5) engages the finger on the clapper thereby rendering the clapper inoperative.

In Fig. 7, the parts illustrated are as when the motor switch is moved to closed position, the release mechanism, including the bell-crank 49 and trip lever 50 are disposed in position for engagement with the trigger, and the alarm-controlling parts are in inoperative position. While the parts are thus disposed the dispensing operation is carried out without action of the alarm.

Figure 8:
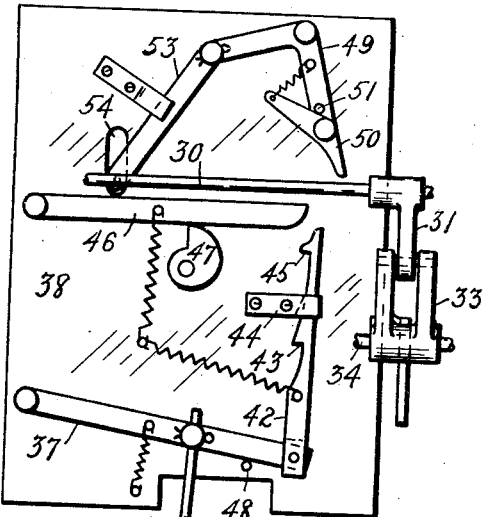

In Fig. 8, the parts illustrated are as when the motor switch is returned to open position, the release mechanism, after having tripped the trigger has resumed its normal position, and the alarm-controlling parts are disposed in position to permit sounding of the alarm.

Figure 9:
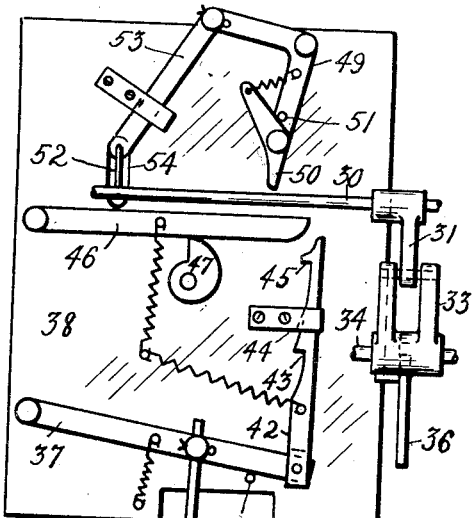

In Fig. 9, the parts illustrated are as when the motor switch is again closed while the alarm-controlling parts are disposed in position to permit sounding of the alarm. Thus it will appear that closing of the switch and consequent starting of the dispensing apparatus, without first resetting the counter or computer, is accompanied by alarm.

Figure 10:
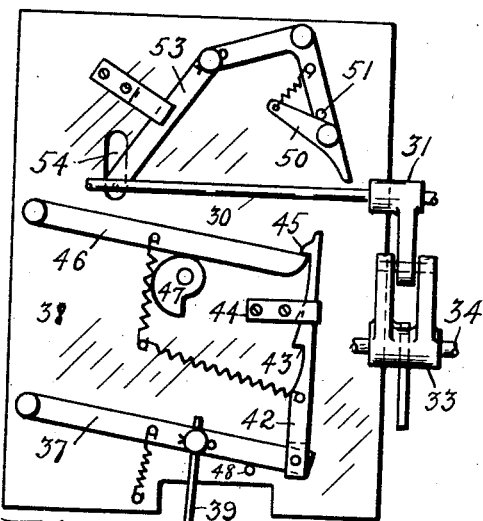

In Fig. 10, the parts illustrated are as when the motor switch is returned to open position, the alarm-controlling parts are disposed in position to permit sounding of the alarm, and the trigger operating lever 46 has engaged the trigger preparatory to elevating the trigger upon resetting of the counter or computer. Operating the dispenser while the parts are thus disposed results in sounding of the alarm.

Figure 11:
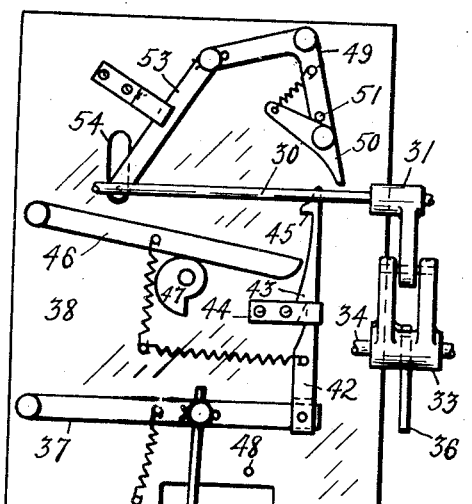

In Fig. 11, the parts illustrated are as when the motor switch is open, and the alarm-controlling parts have been reset following the resetting action of the cam 47, the trigger having been elevated thereby to latched position. When the parts are thus disposed the dispensing operation is carried out without operation of the signal.

The dispensing apparatus as herein set forth is in a preferable form for use in automobile filling stations for vending gasoline, and is merely exemplary. While the controlling mechanism in the form shown is arranged in connection with an audible signal in a manner to circumvent operation of the signal upon resetting of the indicator on the dispenser, such controlling mechanism may be employed in connection with various other signaling devices or other operable parts of the dispenser which it may be desired to move automatically into or out of operative position upon resetting of the indicator for the dispenser. Also, the invention may readily be applied generally to apparatus having resettable indicators and associated operating mechanisms wherever it may be desired to control operation of such mechanisms automatically upon resetting of the indicator.

The value of the invention lies in the facility afforded that assures to the proprietor, operator, and patrons of proper operation of the dispenser.

What I claim is:

1. An automatically operated alarm for a liquid dispenser having a motor-driven pump provided with a controlling switch, a meter, a resettable indicator actuated by said meter, and a dispensing nozzle, said alarm consisting of a bell, a clapper for said bell, an interference member operable to prevent action of said clapper, and a connection between said interference member and the resetting mechanism of said indicator arranged to move said interference member into operating position only upon resetting of said indicator.

2. An automatically operated alarm for a liquid dispenser, said alarm consisting of a bell, a clapper for said bell, an interference member operably associated with said clapper adapted to interrupt operation of said clapper, and a connection between said member and the resetting mechanism of the indicator of said dispenser whereby the alarm mechanism is moved to silence position only upon resetting of the indicating mechanism.

3. An automatically operated signal for a liquid dispenser provided with a resettable indicator, actuating means for said signal, an interference member adapted to prevent operation of said actuating means, and a connection between said interference member and resetting mechanism of said indicator to move said interference member to a selected position whereby to prevent operation of said signal only upon resetting of said indicating mechanism.

4. Liquid dispensing apparatus having a switch-controlled motor-driven pump, a meter-actuated resettable indicator operatively associated with the pump, a dispensing means provided with a discharge nozzle, a supporting hook for said nozzle, mechanism for opening and closing said switch including a lever associated with said hook adapted to be moved so as to cause opening of said switch when said nozzle is positioned on said hook, and a signal provided with control means therefor associated with the resetting mechanism of said indicator so arranged that the signal is moved out of action only upon resetting of said indicator and is operable when said pump is started without first resetting said indicator.

5. An automatically operated signal mechanism for a liquid dispenser, which dispenser has a switch-controlled motor-driven pump, a meter-driven resettable indicator operatively associated with said pump, and a dispensing means, said mechanism consisting of a signal having operable relation with said pumping means, an interference member adapted to prevent operation of said signal, a trigger controlled member operably connected with said interference member and the resetting mechanism of said indicator so arranged that operation of the interference member is dependent upon resetting of said indicator, and a releasing mechanism operably associated with said dispensing means and trigger member arranged to cause said interference member to move into operative position only when said pump is started without the indicator having been first reset.

6. A signal for a liquid dispenser of the type having a motor-driven pump and a dispensing means, a meter-driven resettable indicator operatively associated with the pump and said dispensing means, an interference member adapted to prevent operation of said signal, a trigger operably connected with said interference member and the resetting mechanism of said indicator to cause operation of said interference member upon resetting of said indicator, and a releasing mechanism engageable with said trigger and operatively connected with said dispensing means so arranged that said signal becomes operative only when the dispenser is operated without the indicator having been first reset.

7. A signal for a liquid dispenser of the type having a liquid supply means and a dispensing means, a meter-driven resettable indicator operably associated with said supply means and dispensing means, controlling mechanism for said signal including a trigger adapted to hold said signal out of operating position upon resetting of said indicator, and a releasing mechanism arranged and adapted to disengage the trigger to permit the signal to move into position for action only when the dispenser is operated without the indicator having been first reset.

MAXIMILLIAN O. TRUDEAU.